(12) United States Patent
Nizani

(10) Patent No.: US 6,952,010 B2
(45) Date of Patent: Oct. 4, 2005

(54) OPTICAL SYSTEM AND METHOD FOR SWITCHING SENSOR CHANNELS WHILE SIMULTANEOUSLY VIEWING A SCENE IN A DIFFERENT WAVELENGTH RANGE

(75) Inventor: Zvi Nizani, Nofit (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 167 days.

(21) Appl. No.: 10/202,548

(22) Filed: Jul. 23, 2002

(65) Prior Publication Data

US 2003/0053181 A1 Mar. 20, 2003

(30) Foreign Application Priority Data

Jul. 30, 2001 (IL) .................................................. 144639

(51) Int. Cl.[7] .................................................. H01J 3/14
(52) U.S. Cl. ...................................... 250/236; 250/216
(58) Field of Search ........................ 250/216, 234–236; 359/204

(56) References Cited

U.S. PATENT DOCUMENTS

| 5,367,399 A | 11/1994 | Kramer | 359/206 |
| 5,387,995 A * | 2/1995 | Harig | 359/204 |
| 5,420,946 A | 5/1995 | Tsai | 385/22 |
| 5,512,750 A | 4/1996 | Yanka et al. | 250/338.4 |
| 5,900,942 A | 5/1999 | Spiering | 356/400 |

FOREIGN PATENT DOCUMENTS

| JP | 10-199016 | * | 7/1998 |
| WO | WO 99/02950 | | 1/1999 |

OTHER PUBLICATIONS

Lareau et al. "Dual band framing camera:technology and status". *Proceeding of SPIE*, vol. 4127, pp. 148–150 (2000).
Lloyd. *Thermal Imaging Systems*. Plenum Press, New York, p. 256 (1982).

* cited by examiner

*Primary Examiner*—Thanh X. Luu
(74) *Attorney, Agent, or Firm*—Merchant & Gould P.C.

(57) ABSTRACT

An optical system for receiving an incoming beam of electromagnetic radiation, for dividing it into a transmitted beam, containing a part of the wavelength band of the incoming beam, and a reflected beam, containing the remainder of the wavelengths in the incoming beam, and for transferring the transmitted beam continuously to a detector. The system is capable of switching the reflected beam between any one of two or more detectors. The system comprises an objective lens, a dichroic beamsplitter cube, a first detector, capable of detecting radiation in a first wavelength band, a second group of two or more detectors, each capable of detecting radiation in a second wavelength band and means of rotating the dichroic beamsplitter cube, so as to switch between the detectors of the second group.

16 Claims, 4 Drawing Sheets

US 6,952,010 B2

OPTICAL SYSTEM AND METHOD FOR SWITCHING SENSOR CHANNELS WHILE SIMULTANEOUSLY VIEWING A SCENE IN A DIFFERENT WAVELENGTH RANGE

FIELD OF THE INVENTION

The present invention relates to the field of optical systems. More specifically it relates to an optical system that receives an incoming beam of electromagnetic radiation, divides the incoming beam into a transmitted beam, containing a part of the wavelength band of the incoming beam, and a reflected beam, containing the remainder of the wavelengths in the incoming beam, transfers the transmitted beam continuously to a detector, and is further capable of switching the reflected beam between any one of two or more detectors.

BACKGROUND OF THE INVENTION

Many different optical systems have been devised for enabling the simultaneous observation of an optical signal or scene in more than one wavelength region. For example, Lareau and Partynski describe a dual image reconnaissance camera capable of operating in the visible or infrared spectral bands or in both simultaneously. The camera functions by collecting an image with a single objective lens and re-imaging this image into two separate optical channels through a CaFl beam divider/prism. Each of the channels contains appropriate optics, including a wafer-scale focal plane array for capturing images in the appropriate region of the optical spectrum (Lareau and Partynski, *Dual band framing cameras: technology and status*, Proceedings of SPIE, Vol. 4127 (2000) 148–150).

U.S. Pat. No. 5,512,750 discloses another method of producing simultaneous images in two different wavelength regions. In this case, sensors producing simultaneous, superimposed, two-dimensional images in two IR bands with the dual band detector arrays monolithically integrated upon a common substrate are described. Here the incoming infrared image is viewed simultaneously in the medium and long wave infrared bands.

Another useful property of optical systems is the ability to switch an image from one optical track to another, enabling the image to be viewed at different locations, with different types of detectors, and even in different spectral regions, according to the decision of the operator of the system. A common method of accomplishing this is to make use of switching mirrors that are moved in and out of the optical path to direct the beam to different directions. Typical optical arrangements of this sort are described in: Lloyd, J M, *Thermal Imaging Systems*, Plenum Press, New York and London, 1982, p.256.

Although it would be advantageous for many applications to be able to provide optical systems with both properties, i.e. the ability to simultaneously observe the same image in different wavelength regions and also to switch at least one of the images between different detectors, to date optical systems containing both of these properties do not exist. Such a combination would be especially useful, for example, for a system comprising a video camera combined with a laser range finder and a laser designator receiver or for an optical communication system in which fiber optical components replace the optical detectors.

It is therefore a purpose of the present invention to provide an optical system that receives an incoming beam of electromagnetic radiation, divides the incoming beam into a transmitted beam, containing a part of the wavelength band, and a reflected beam, containing the remainder of the wavelengths, transfers the transmitted beam continuously to a detector, and is further capable of switching the reflected beam between any one of two or more detectors.

It is a further purpose of the present invention to provide a communication system that receives an incoming signal, divides the incoming signal into a transmitted signal, containing a part of the wavelength band, and a reflected signal, containing the remainder of the wavelengths, transfers the transmitted signal continuously to fiber optical elements, and is further capable of switching the reflected signal between any one of two or more fiber optical elements.

Further purposes and advantages of this invention will appear as the description proceeds.

SUMMARY OF THE INVENTION

In a first aspect the invention is directed towards an optical system for receiving an incoming beam of electromagnetic radiation, for dividing it into a transmitted beam, containing a part of the wavelength band of the incoming beam, and a reflected beam, containing the remainder of the wavelengths in the incoming beam. The optical system transfers the transmitted beam continuously to a detector, while being further capable of switching the reflected beam between any one of two or more detectors.

The system comprises:
- an objective lens;
- a dichroic beamsplitter cube;
- a first detector, capable of detecting radiation in a first wavelength band;
- a second group of two or more detectors, each capable of detecting radiation in a second wavelength band; and
- a means of rotating the dichroic beamsplitter cube in order to switch between the detectors of the second group.

In a second aspect the invention is directed toward a communication system that receives an incoming signal, divides the incoming signal into a transmitted signal, containing a part of the wavelength band of the incoming signal, and a reflected signal, containing the remainder of the wavelengths in the incoming signal. The system transfers the transmitted signal continuously to fiber optical elements, and is further capable of switching the reflected signal between any one of two or more fiber optical elements. The communication system of the invention comprises:
- an objective lens;
- a dichroic beamsplitter cube;
- a first fiber optical element, capable of transferring signals in a first wavelength band;
- a second group of two or more fiber optical elements, each capable of conducting signals in a second wavelength band; and
- a means of rotating the dichroic beamsplitter cube in order to switch between the fiber optical elements of the second group.

In a further aspect, the invention is directed towards a method for dividing an incoming beam of electromagnetic radiation into a transmitted beam, containing a part of the wavelength band of the incoming beam, and a reflected beam, containing the remainder of the wavelengths in the incoming beam. The method transfers the transmitted beam continuously to a detector, and switches the reflected beam between any one of two or more detectors. The method consists of the following steps:

passing the incoming beam through an objective lens;

placing a dichroic beamsplitter cube on the optical axis of the objective lens at a location between the lens and its focal point;

placing a first detector, capable of detecting radiation in a first wavelength band, at the focal point of the transmitted beam;

placing a second group of two or more detectors, each capable of detecting radiation in a second wavelength band at the focal point of the reflected beam; and providing a means of rotating the dichroic beamsplitter cube in order to switch between the detectors of the second group.

In all of the aspects of the invention:

the incoming beam can consists of radiation in the ultraviolet and/or visible and/or infrared regions of the electromagnetic spectrum;

the dichroic beamsplitter cube is made by gluing together two triangular right prisms one of the prisms having a dielectric coating (partially reflecting layer) applied to its diagonal face before gluing and having the faces of the dichroic beamsplitter cube, through which the light beams pass, coated with broadband antireflective coatings;

the dichroic beamsplitter cube can be rotated either about the optical axis of the system with the focal point of the reflected beam moving in a plane perpendicular to the optical axis or the dichroic beamsplitter cube can be rotated about an axis perpendicular to the optical axis of the system with the focal point of the reflected beam moving in the plane containing the optical axis;

static lenses can be placed in front of some or all of the detectors thereby allowing control of the optical focal length and the field of view; and some or all of the detectors can be replaced with fiber optical elements. All the above and other characteristics and advantages of the invention will be further understood through the following illustrative and nonlimitative description of preferred embodiments thereof, with reference to the appended drawings.

DETAILED DESCRIPTION OF PREFERRED EMBODIMENTS

Figure 1A:
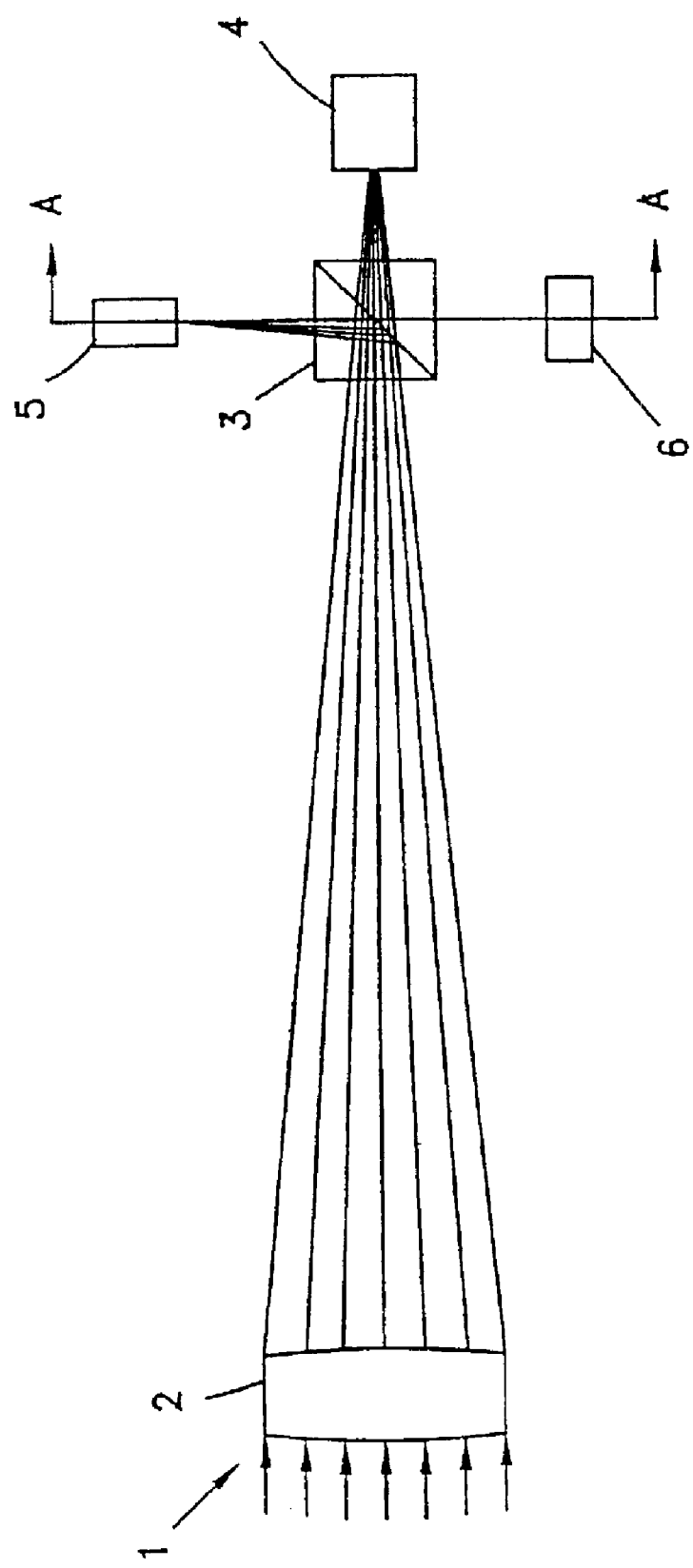
FIG. 1A is a schematic top view showing the basic embodiment of the optical system of the invention

The invention will now be further explained through the illustrative and non-limitative description of preferred embodiments. FIG. 1A is a schematic top view showing the basic embodiment of the optical system of the invention. An incoming light beam, generally indicated by numeral 1, is focused by objective lens 2. A rotatable dichroic beamsplitter cube 3 is centered on the optical axis (Z) of the system, between the objective lens and the focal point. Part of the energy of the beam, lying within a certain wavelength region, passes directly through the cube, falling on detector 4. The remainder of the energy of the beam (except for losses due to absorption or unwanted reflections), lying in a different wavelength range, is reflected, falling onto detector 5. Rotating the cube by 90° counterclockwise about an axis perpendicular to the plane of the figure will cause the reflected part of the incoming beam top fall on detector 6.

Rotating the cube in this manner places limitations on the system, for example on the number of detectors that can be placed around the dichroic beamsplitter cube and in their locations. To overcome these restrictions, in a preferred embodiment of the invention, the cube is rotated around the optical (Z) axis. In this case, the focal point of the reflected beam traces out a circle, surrounding the cube, in a plane perpendicular to the plane of the paper with its center located at the intersection of the plane with the optical axis. Detectors can be placed at any position on this circle.

Figure 1B:
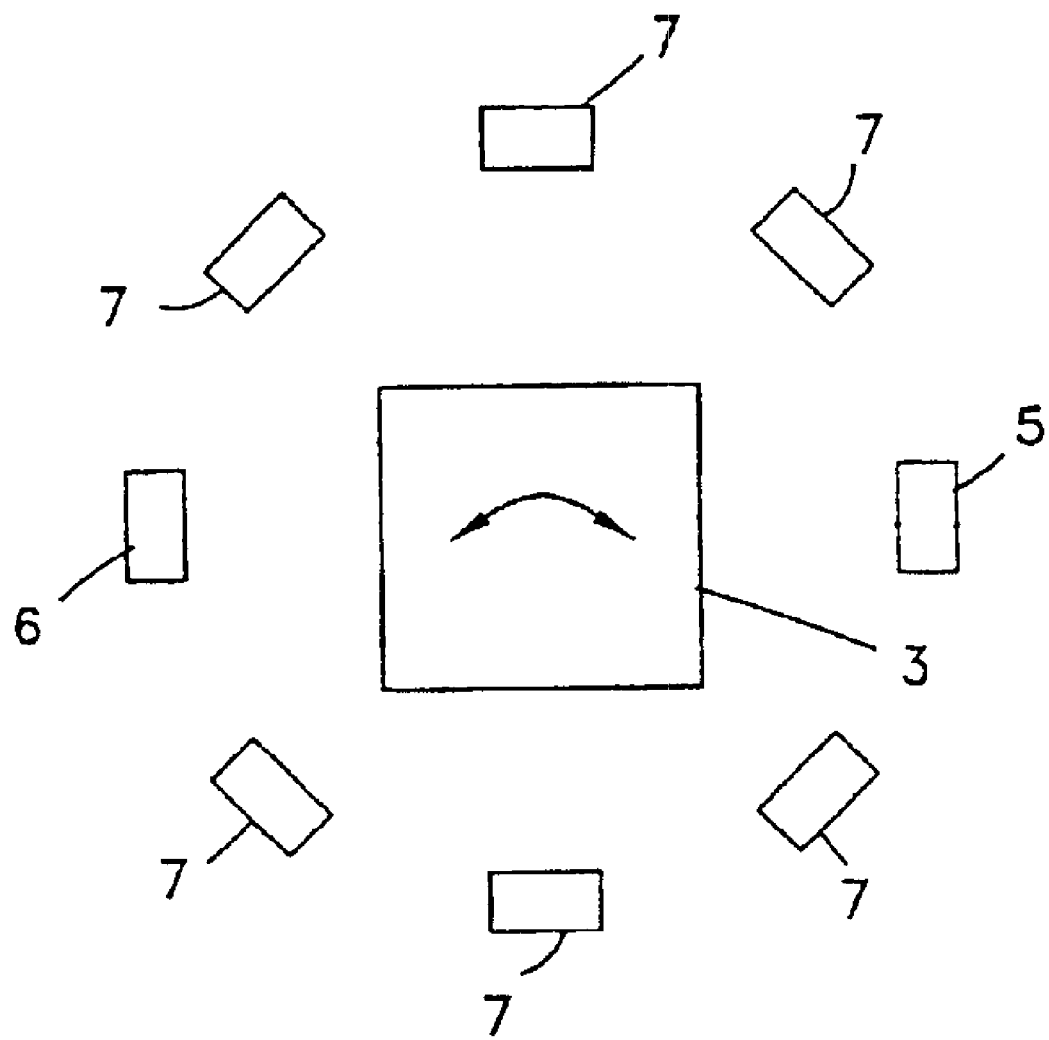
FIG. 1B is a cross section in the AA plane of FIG. 1A.

FIG. 1B is a cross section in the AA plane of FIG. 1A that illustrates this preferred embodiment. Numeral 3 designates the dichroic beamsplitter cube. The detectors of FIG. 1 are shown at 5 and 6 and numeral 7 designates additional detectors that can be placed on the circle surrounding the cube.

Persons familiar with the art will understand that the number of detectors that can be used will depend on the size of the detectors and the distance from the center of the cube to the focal point of the objective lens. By the use of additional optics, such as coupling lenses and optical fibers, it is possible to place the detectors a distance remote from the cube and at the same time increase their number if necessary for a particular application. In addition, placing static lenses in front of the detectors allows control of the optical focal length of each channel and determines the field of view.

The system of the invention can operate in the ultraviolet and/or visible and/or infrared regions if suitable materials are chosen for constructing the optical elements. The ratio of transmitted to reflected energy and the division of the wavelength range of the incident beam into the ranges of the direct and reflected beams depends upon the properties of the reflective surface of the beamsplitter cube. The considerations necessary to make these design decisions are well known to the man of the art and will not be further discussed herein for the sake of brevity.

Figure 2:
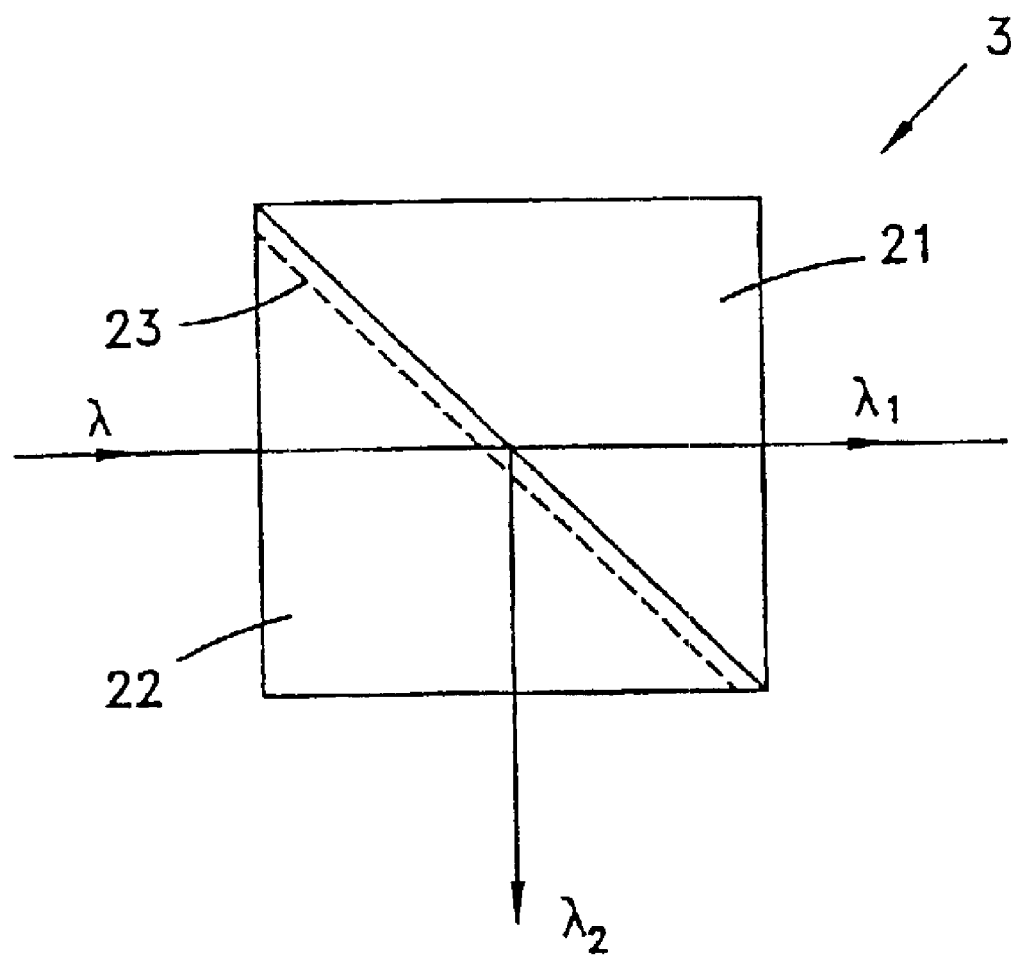
FIG. 2 schematically shows the dichroic beamsplitter cube.

FIG. 2 shows the dichroic cube 3. The cube is made by gluing together two triangular right prisms, 21 and 23. Before gluing the prisms together, a dielectric-dichroic partially reflecting coating is applied to the diagonal face of one of the prisms. In FIG. 2, the dashed line 23, represents such a layer applied to the surface of prism 21. The material of the cube and the coatings are chosen to give it broadband transmission over the desired wavelength range. The dichroic reflecting layer is designed to selectively reflect specific wavelengths in the incident beam while transmitting the remainder. Also the ratio of reflected to transmitted energy can be adjusted. Typically the faces through which the light beams pass are coated with a broadband anti-reflective coating and there is some energy loss due to absorption in the coating layer.

FIG. 2 illustrates the division of a beam composed of a range of wavelengths $\lambda$ that is divided into two groups of wavelengths $\lambda_1$ and $\lambda_2$ that travel in mutually perpendicular directions after encountering the reflective layer in the dichroic cube 3.

Figure 3:
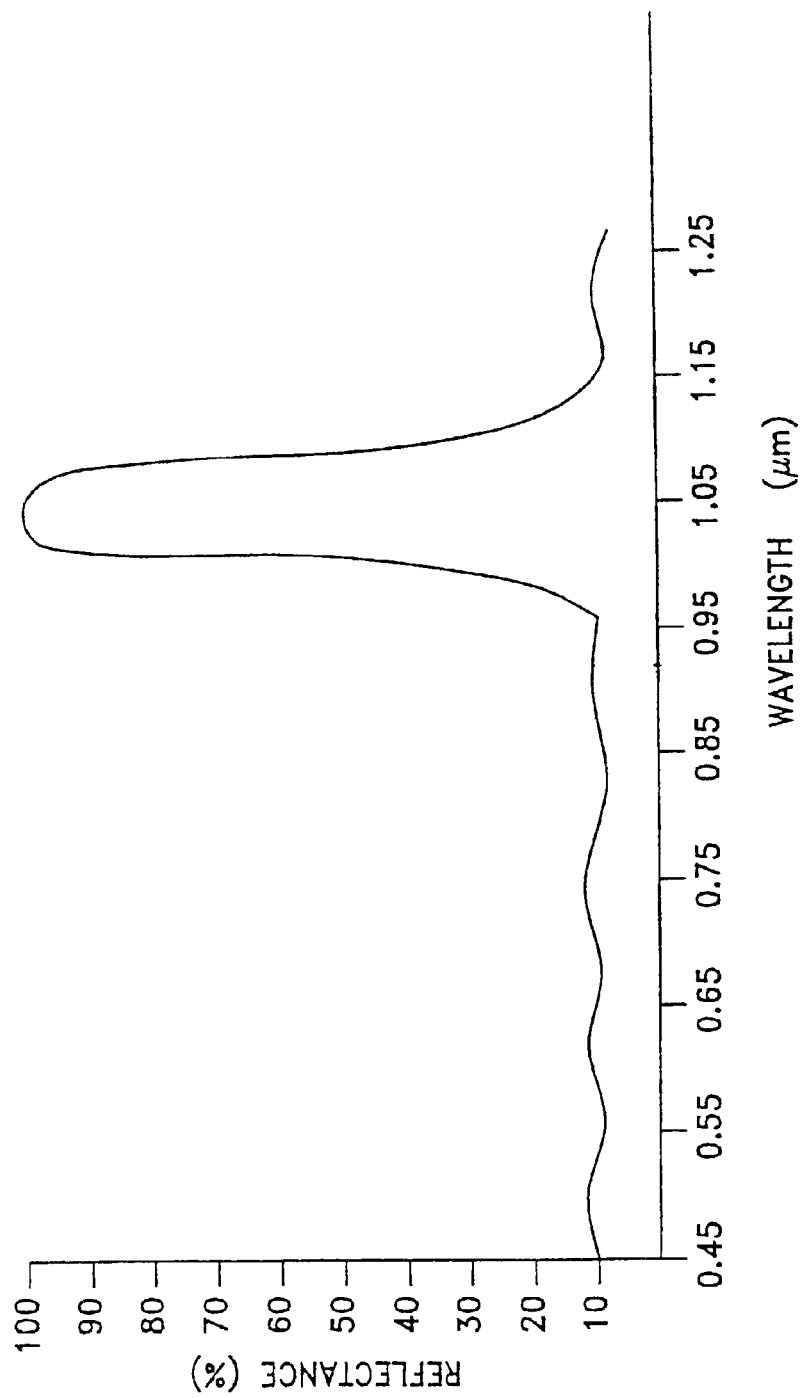
FIG. 3 is a schematic graph showing the variation of reflectance with wavelength for a typical dielectric-dichroic reflecting coating that forms the partially reflecting layer of the dichroic cube.

FIG. 3 is a schematic graph showing the variation of reflectance with wavelength for a typical dielectric coating that forms the reflecting layer of the dichroic cube. Referring to FIG. 2, a light beam comprising wavelengths λ in the visible and near infrared range (for example 0.45–1.2 μm) passes through a dichroic beamsplitter cube having a reflecting layer characterized by the graph of FIG. 3. A relatively narrow band of wavelengths centered at about 1.05 μm will be reflected at the layer to form $\lambda_2$. The remainder of the wavelengths will travel through the cube undisturbed and will constitute the beam $\lambda_1$.

As can be appreciated by the man of the art, the system is extremely flexible and can be built to operate in any wavelength region by using either especially designed components or readily available off-the-shelf items. As an illustrative and non-limitative example, the following components could be assembled to create an optical system for continuous observation of a scene in the visible wavelengths while switching the same image of the scene in the near infrared between two detectors. Referring to FIG. 1A:

- Objective lens (2)—Achromat Lens H45354 (Edmund Scientific Company)
- Dichroic beamsplitter cube (3)—BNPB-20B coated with a BC R1064/T532 P4 dichroic layer(lambda Research Optics, Inc.)
- Detector (4)—Monochrome CCD camera XC-75 (Sony Corp.)
- Detectors (5 and 6)—Passive photodiode detectors E10RUV or E3RIR (Linos Photonics).

In another embodiment, the system of the invention can also be used in communication systems. Replacing the detectors in the embodiments described above with fiber optical elements results in a system providing one continuous channel of communication and a second channel, carrying identical information that, by rotation of the dichroic cube beamsplitter, can be switched between different data links. The methods and optical elements necessary to construct and operate this embodiment of the invention are well known in the art and will not be further discussed here.

The means of mounting the optical elements and rotating the beamsplitter cube to effect the switching between detectors are conventional and well known in the art. Therefore, they will not be further described here in the interest of brevity.

Although embodiments of the invention have been described by way of illustration, it will be understood that the invention may be carried out with many variations, modifications, and adaptations, without departing from its spirit or exceeding the scope of the claims.

What is claimed is:

1. An optical system comprising:
    a first detector, capable of detecting radiation in a first wavelength band;
    a group of detectors, said group comprising two or more detectors, each of which is capable of detecting radiation in a second wavelength band;
    a dichroic beamsplitter cube, dividing an incoming beam of electromagnetic radiation into a transmitted beam comprising said first wavelength band and a reflected beam comprising said second wavelength band; and
    an objective lens receiving said incoming beam of electromagnetic radiation, directing it through said dichroic beamsplitter cube, and focusing said transmitted beam of radiation onto said first detector and said reflected beam onto one of said two or more detectors in said group of detectors;
    wherein said dichroic beamsplitter cube is rotated about an appropriate axis, the focus of said transmitted beam does not move and the focus of said reflected beam is switched from said one of said one or more detectors in said group of detectors to another detector in said group.

2. An optical system, according to claim 1, wherein the incoming beam comprises radiation in the ultraviolet and/or visible and/or infrared regions of the electromagnetic spectrum.

3. An optical system, according to claim 1, wherein the dichroic beamsplitter cube is rotated about the optical axis of said system and the focal point of the reflected beam moves in a plane, said plane being perpendicular to said optical axis.

4. An optical system, according to claim 1, wherein the dichroic beamsplitter cube is rotated about an axis perpendicular to the optical axis of said system and the focal point of the reflected beam moves in a plane containing said optical axis.

5. An optical system, according to claim 1, wherein the dichroic beamsplitter cube is made by gluing together two triangular right prisms, one of said prisms having a dielectric coating applied to its diagonal face before gluing.

6. An optical system, according to claim 1, wherein the faces of the dichroic beamsplitter cube through which incident, transmitted, and reflected beams of radiation pass are coated with broadband antireflective coatings.

7. An optical system, according to claim 1, wherein static lenses are placed in front of at least some of the detectors thereby providing control of the optical focal length and the field of view.

8. An optical system, according to claim 1, wherein fiber optical elements are placed between the dichroic beamsplitter cube and at least some of the detectors.

9. A method for dividing an incoming beam of electromagnetic radiation into two beams of radiation, including a transmitted beam, having a first wavelength band comprising a part of the wavelengths of the radiation of said incoming beam, and a reflected beam, having a second wavelength band comprising the remainder of the wavelengths of said radiation of said incoming beam; transferring said transmitted beam continuously to a first detector; and switching said reflected beam between any one of two or more detectors in a group of detectors; said method comprising:
    providing an optical system comprising:
    a first detector, capable of detecting radiation in said first wavelength band;
    a group of detectors, said group comprising two or more detectors, each of which is capable of detecting radiation in said second wavelength band;
    a dichroic beamsplitter cube, which divides said incoming beam of electromagnetic radiation into a transmitted beam comprising said first wavelength band and a reflected beam comprising said second wavelength band;
    an objective lens receiving said incoming beam of electromagnetic radiation, directing it through said dichroic beamsplitter cube, and focusing said transmitted beam of radiation onto said first detector and said reflected beam onto one of said two or more detectors in said group of detectors;
    passing said incoming beam of radiation through said objective lens; and
    rotating said dichroic beamsplitter cube in order to switch the focus of said reflected bean between said two or more detectors in said group of detectors.

10. A method, according to claim 9, wherein the incoming beam comprises radiation in the ultraviolet and/or visible and/or infrared regions of the electromagnetic spectrum.

11. A method, according to claim 9, wherein the dichroic beamsplitter cube is rotated about the optical axis of said system and the focal point of the reflected beam moves in a plane, said plane being perpendicular to said optical axis.

12. A method, according to claim 9, wherein the dichroic beamsplitter cube is rotated about an axis perpendicular to an optical axis of said system and the focal point of the reflected beam is located in the plane containing said optical axis.

13. A method, according to claim 9, wherein the dichroic beamsplitter cube is made by gluing together two triangular right prisms one of said prisms having a dielectric coating applied to its diagonal face before gluing.

14. A method, according to claim 9, wherein the faces of the dichroic beamsplitter cube through which incident, transmitted, and reflected beams of radiation pass are coated with broadband antireflective coatings.

15. A method, according to claim 9, wherein static lenses are placed in front of at least some of the detectors thereby allowing control of the optical focal length and the field of view.

16. A method, according to claim 9, wherein fiber optical elements are placed between the dichroic beamsplitter cube and at least some of the detectors.

* * * * *